July 9, 1957  J. D. ALTEMUS  2,798,351
PNEUMATIC COTTON HARVESTER WITH GYRATING PICKING FINGERS
Filed Jan. 11, 1954  5 Sheets-Sheet 3
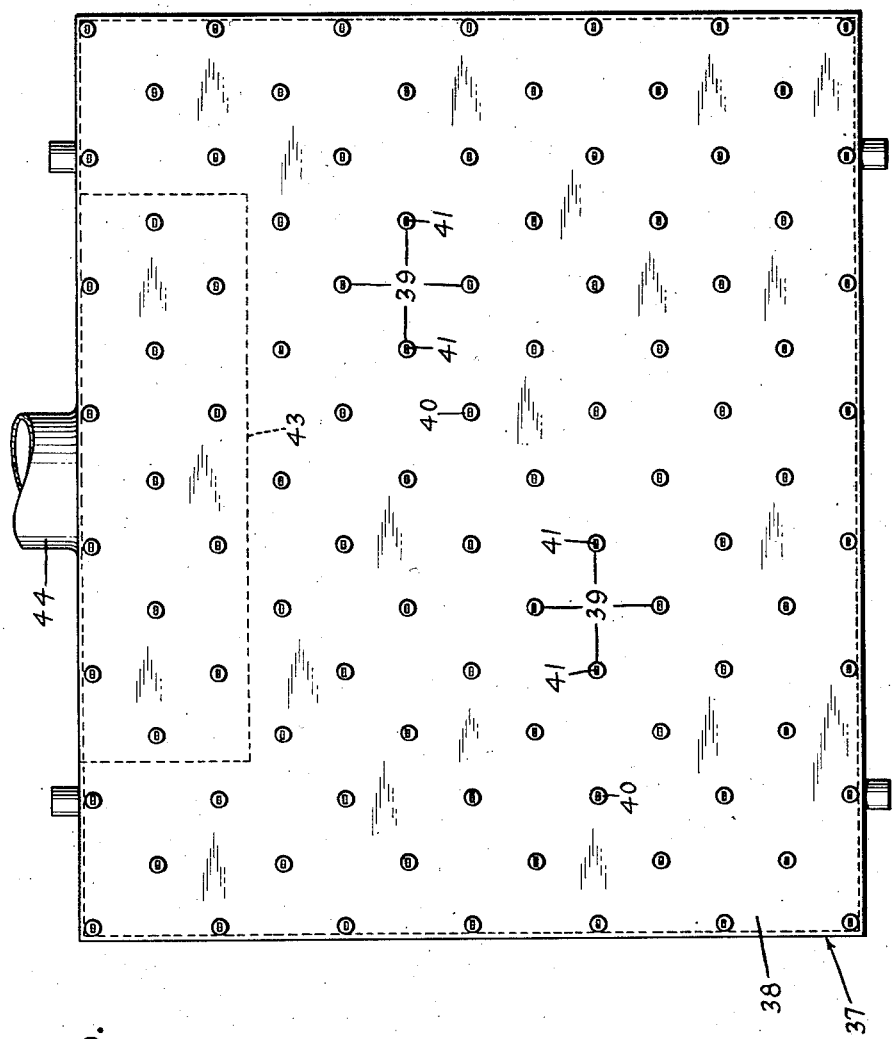
FIG.4.
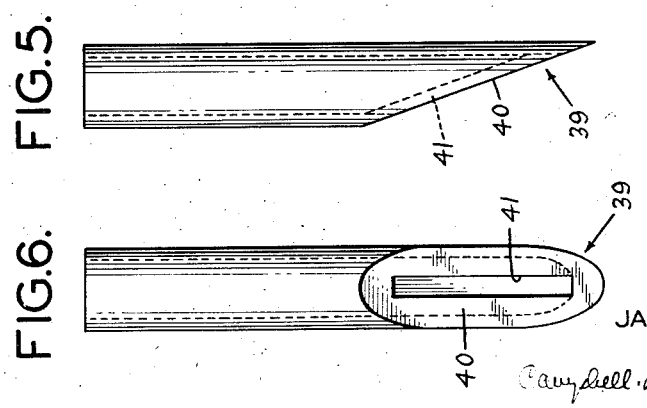
FIG.5.
FIG.6.
INVENTOR.
JAMES DOBSON ALTEMUS
BY
HIS ATTORNEYS.

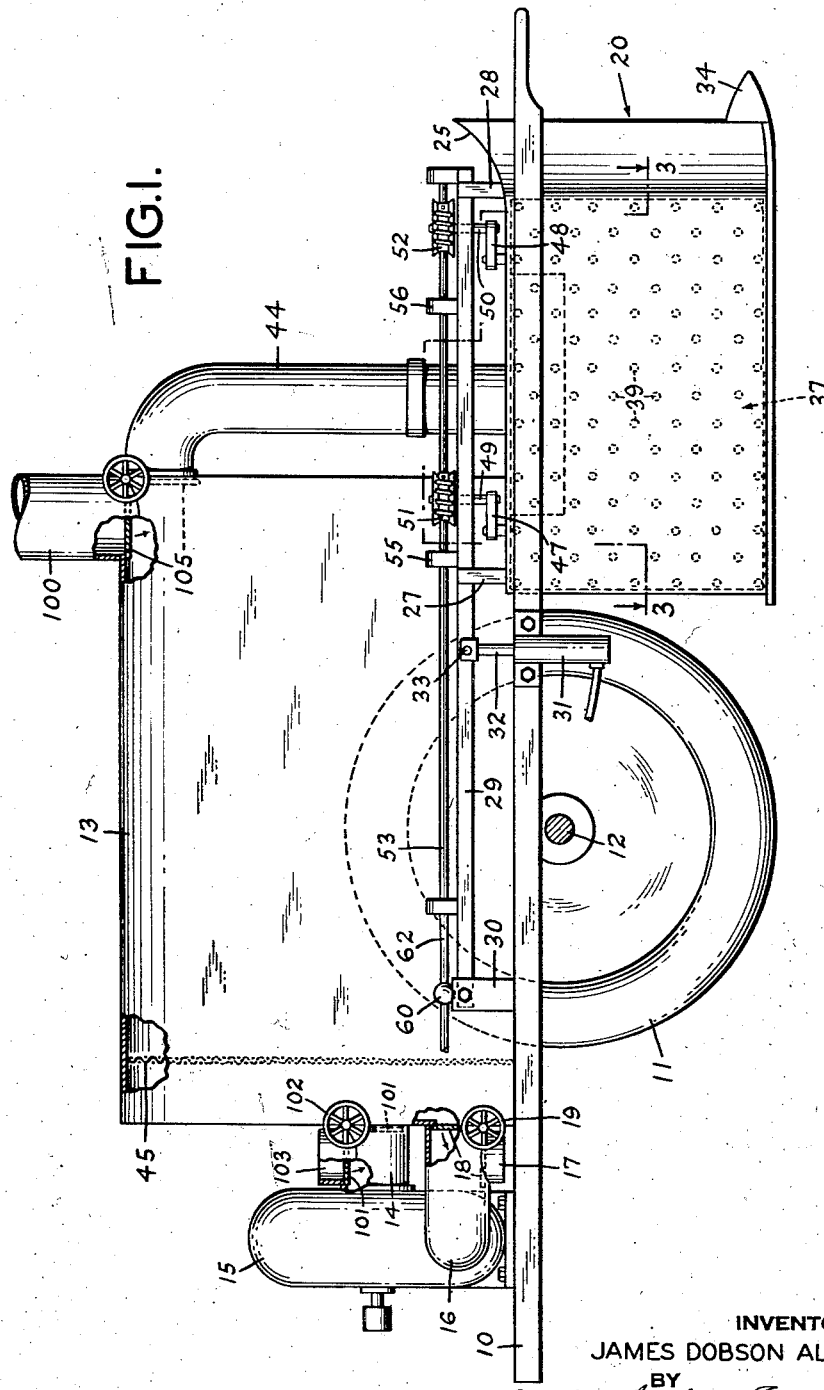

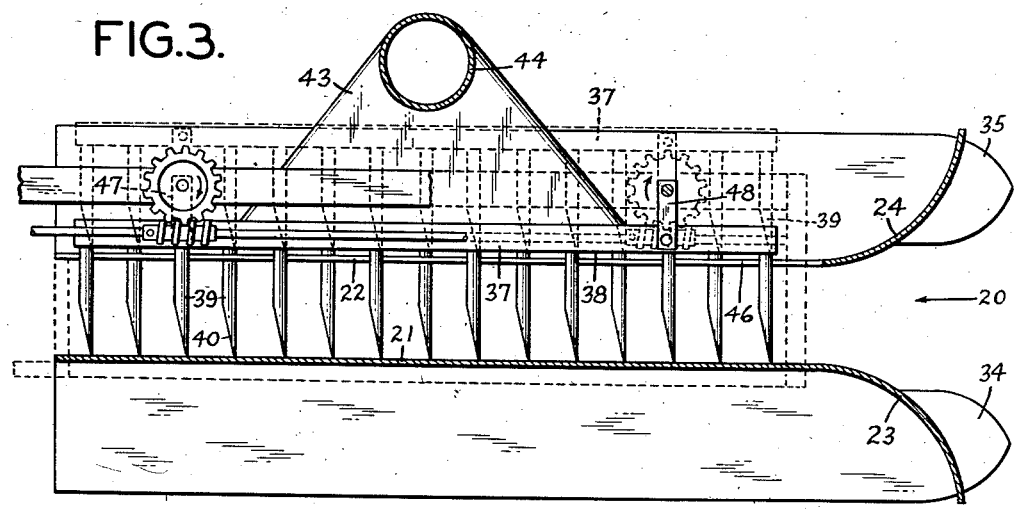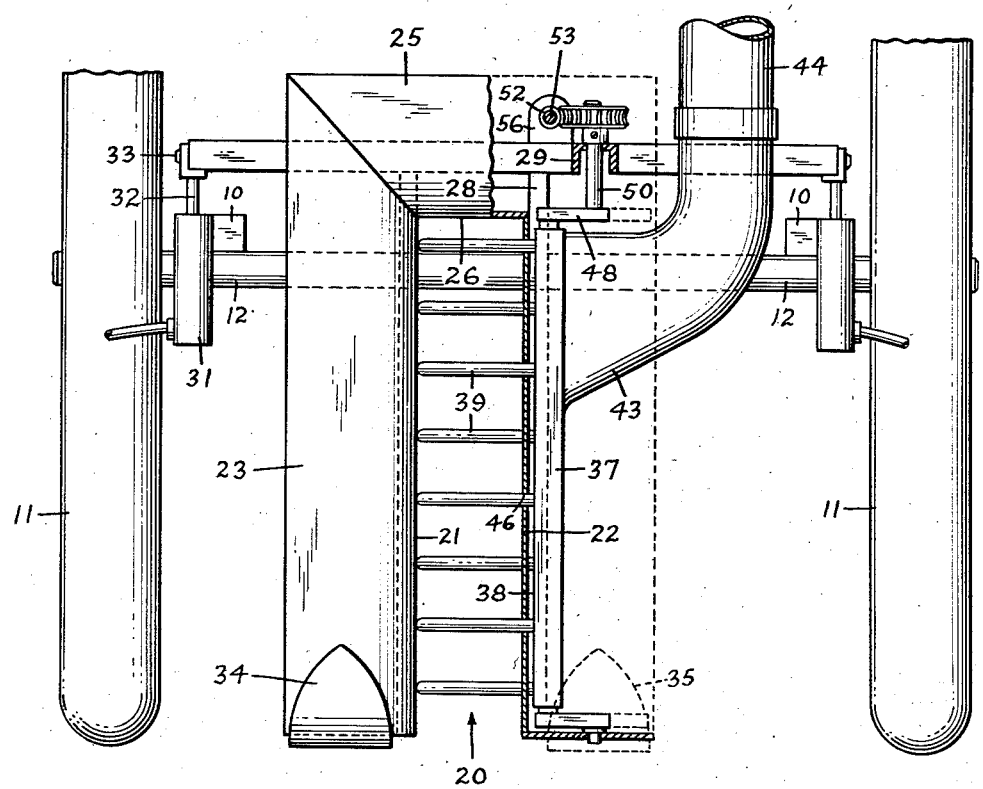

July 9, 1957 J. D. ALTEMUS 2,798,351
PNEUMATIC COTTON HARVESTER WITH GYRATING PICKING FINGERS
Filed Jan. 11, 1954 5 Sheets-Sheet 4

INVENTOR.
JAMES DOBSON ALTEMUS
BY
HIS ATTORNEYS.

# United States Patent Office 2,798,351
Patented July 9, 1957

2,798,351

PNEUMATIC COTTON HARVESTER WITH GYRATING PICKING FINGERS

James Dobson Altemus, New York, N. Y.

Application January 11, 1954, Serial No. 403,223

8 Claims. (Cl. 56—12)

This invention relates to harvesting devices and it relates more particularly to improvements in devices for picking or harvesting cotton.

For many years efforts have been made to build machines which can pick cotton from the plants as efficiently and cleanly as manual labor and at a higher speed and lower cost. The majority of the devices designed for this purpose have failed for one reason or another. However, several machines have been produced recently which have given promise of success even though they are not completely satisfactory on all counts. One type of automatic cotton picker involves the use of a plurality of small spindles or fingers which are rotated and which pass through the cotton plants and pluck the cotton fibres from the cotton bolls. The rotating fingers wrap the fibres around them, and the fibres are then doffed from the fingers and passed to a ginning device where the twigs, leaves, seeds, etc. are separated from the fibres. While this machine is fairly efficient in picking cotton, it nevertheless has disadvantages. The principal disadvantage of the machine is that leaves, stems and other debris are collected with the fibres and are wrapped into the coils of fibres produced by the twisting fingers so that it is difficult to separate the unwanted material from the cotton fibres.

Another kind of machine which has some advantages involves the use of air suction for plucking the bolls. The disadvantage of this device is that it is not selective and, as a consequence, will pluck anything from the plant that is sufficiently loose, such as sticks, leaves and even dirt particles and the like. As a result, the cotton is dirty and is of lower quality than cotton picked by hand.

The present invention involves the use of suction to remove the fibres from the bolls and it involves a new principle of operation whereby the fibres may be drawn from the bolls without collecting debris such as stems, leaves and the like.

More particularly, in accordance with the present invention, the new machine has a large number of relatively small picking fingers which are hollow and have slotted sides through which air is drawn to entrain the cotton fibres. The fingers are moved into and out of the cotton plant at all levels thereof and thereby engage the bolls and strip the cotton fibres from them. Leaves, twigs and the like of substantial size which may also be entrained in the air cannot pass through the narrow slots in the fingers so that these elements are screened from the fibres during the picking operation. The unwanted debris, such as leaves, stems and the like, is stripped from the fingers during the picking operation and is discharged onto the ground. The separated fibres are collected in a bin or hopper from which they can be discharged periodically for ginning and further treatment.

The apparatus described generally above has the advantage that it does not tangle or twist the fibres and, in fact, due to the air entraining action the fibres are straightened without damaging them. It also separates the large debris from the fibres so that the debris does not have to be removed during the ginning operation.

The use of a plurality of fingers which are moved into and out of the cotton plants in the rows repeatedly subjects the plants to picking actions so that the fibres are removed effectively from the plants. The use of a plurality of suction fingers does away with one of the greatest disadvantages of the vacuum type of picker, namely, of wrapping the fibres around the twigs or stems of the cotton plant and leaving them behind and clinging to the stems after the fibres have been dislodged from the cotton bolls.

For a better understanding of the present invention, reference may be had to the accompanying drawings in which:

Fig. 1 is an elevational view of a typical device embodying the present invention with parts broken away and shown in section;

Fig. 2 is an enlarged fragmentary front elevational view of the device with parts broken away and shown in section;

Fig. 3 is a view in section taken on line 3—3 showing the actuating mechanism for the picking fingers;

Fig. 4 is an enlarged view in front elevation of the manifold utilizing and carrying the picking fingers and showing the arrangement of the picking fingers thereon;

Fig. 5 is an enlarged view in side elevation of a typical finger embodying the present invention;

Fig. 6 is a front view of the picking finger;

Figure 7:
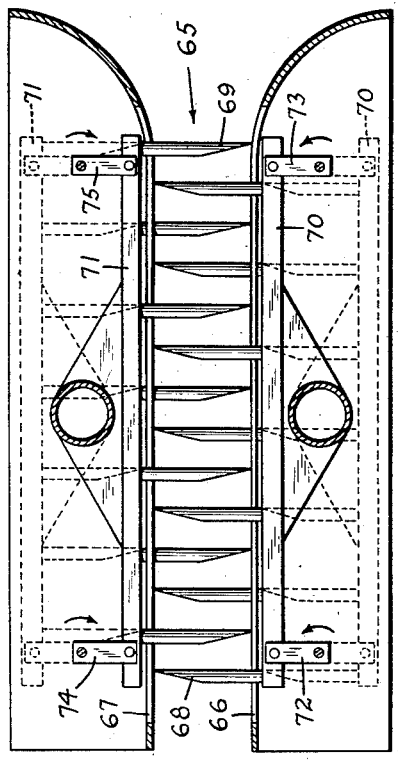
Fig. 7 is a plan view with parts broken away and shown in section of a modified form of picking device utilizing two sets of picking fingers.

My new cotton picker may be of the tractor drawn or horse drawn type or it may be arranged to be self-propelled or pushed by a tractor or the like, as desired. The cotton picker described hereinafter is arranged to be pulled behind a tractor or other motor vehicle.

As shown in Fig. 1, the device may consist of a frame or chassis 10 which may be formed of steel or the like as desired. The frame 10 is supported on a pair of wheels 11 which are mounted on an axle 12. The frame 10 is mounted on the axle with or without supporting springs. About midway of the length of the frame 10 is a large substantially airtight box or hopper 13 which is connected by mean of the conduit 14 to the intake port of a vacuum or suction pump 15 of the centrifugal, lobe or gear type. The pump 15 shown in the drawing is a centrifugal pump, but it may be of the Roots-Connersville blower type or any other suitable pump or combination of pumps capable of creating a strong draft of air through the box 13. The exhaust or high pressure conduit or port of the pump 15 is connected to a conduit 16 having a connection with the lower left-hand corner of the box 13 and to a discharge port 17 to atmosphere. Discharge of air from the pump 15 through the port 17 or into the hopper 13 is controlled by means of a flap valve 18 having a hand wheel 19 for operating it. Thus, the air discharged by the pump 15 may be delivered to the hopper 13 or it may be discharged through the port 17 to atmosphere.

The frame 10 carries at its forward end a picking tunnel or tunnel member 20 which is best shown in Figs. 1, 2 and 3. The tunnel may consist of a pair of side plates 21 and 22 which are disposed in spaced apart relation about or slightly less than the width of a row of cotton plants. The leading ends of the side plates 21 and 22 are flared outwardly at 23 and 24 to form a mouth which will gather the branches of the cotton plants and bring them into a relatively compact state. The side plates 21 and 22 are connected at their tops by means of a downwardly converging top plate 25 and by means of a suitable cross plate 26 as shown in Fig. 3. The tunnel 20 is supported by means of the downwardly extending brackets 27 and 28 on a pair of parallel arms 29 only one of which is shown in Fig. 1. The arms 29 are pivoted at their rear end on uprights 30 which are fixed to the frame 10 near the rear end of the hopper 13. The hinge support for the arms 29 and the tunnel 20 is provided to enable the tunnel 20 to be raised and lowered as may be required depending upon operating conditions. The tunnel 20 is raised and lowered by means of a fluid actuated jack 31 such as a hydraulic jack or air cylinder which is mounted on the platform 10 and has its piston rod 32 connected to one or both of the arms 29 by means of the cross shaft 33. The tunnel 20 is open at its rear end so that as the harvester is pushed along by the tractor, the cotton plants are directed into the tunnel and out of its back end. In order to prevent the tunnel from digging into the ground and to facilitate its movement along the ground, the lower edges of the side plates 21 and 22 may be provided with skids or shoes 34 and 35 having upturned leading ends as shown in Figs. 1 and 2.

The tunnel 20 has no picking action in itself and it does not serve to control or direct air or other fluid for the removal of the cotton fibres from the bolls. The cotton fibres are removed from the plants by means of picking fingers which are best shown in Figs. 1, 3 and 4 of the drawings. A typical picking head may include a hollow manifold 37 which is about the height of the tunnel but less than its length. The manifold 37 is formed of a lightweight material such as aluminum so that it does not have substantial mass or inertia.

Extending from the front face 38 of the manifold 37 are a large number of hollow picking fingers 39 of novel construction. Each picking finger 39 may be formed of lightweight tubing of circular or polygonal cross-section and it has a tapered end 40 thereon which is provided with a narrow entrance slot 41. The tubes are about one-half to three-quarters of an inch in diameter and are preferably positioned so that the entrance slots 41 are directed toward the rear end of the tunnel 20. The purpose of this arrangement is to avoid as much as possible the picking of loose stems and leaves. Flow of air into the fingers 39 is produced by the pump 15 referred to above. The pump acts to reduce the pressure in the hopper and inasmuch as the box 13 is connected by means of a flexible but non-collapsible tube 44 to a connection 43 on the back face 44 of the manifold 37, the interior of the manifold 37 is subjected to the reduced pressure in the box 13 and thus causes air to rush into the slots 41 in the fingers. The rapid flow of air into the fingers 39 removes the loose cotton fibres from the bolls. Inasmuch as the fingers may come directly in contact with the cotton fibres in the bolls or very close to the fibres, the air will suck the fibres into the fingers and thence into the manifold plate 37 and then through the conduit 44 into the hopper 13. Discharge of the fibres through the intake of the pump 15 is prevented by means of the filter screen 45 and near the left-hand end of the hopper 13.

The fingers will unavoidably pick up leaves, large twigs and the like which will cling to and bridge across the slots 41 thereby reducing their effectiveness. Such debris can be removed in the manner and with the mechanism now to be described. The fingers 39 extend through slots 46 which extend lengthwise of the plate 22. The whole manifold 37 is supported for gyratory movement on the levers 47 and 48 which are fixed to and rotated by the shafts 49 and 50 carried on the arm 29 in suitable bearings therein. The upper ends of the shafts 49 and 50 are connected by means of a worm, worm gear drive 51 and 52 with the rotary drive shaft 53 extending lengthwise of the arm 29 shown in Fig. 1 and supported by spaced bearings 55 and 56. The shaft 53 has a universal joint 60 substantially in alignment with the pivot supporting the arm 29 and is connected by means of a take-off shaft 62 to the power take-off of the tractor or the like used for propelling the cotton picker. Similarly, the pump 15 may be driven by the power take-off of the tractor or, if desired, a separate gasoline engine may be provided for driving the pump 15 and the shaft 53. The above-described drive mechanism causes the manifold 37 and the fingers 39 to gyrate as indicated by the dotted line positions of the levers 47 and 48 in Fig. 3 of the drawing so that the fingers move back and forth across the space between the side plates 21 and 22 of the tunnel and move from front to rear at about the same speed the cotton plants traverse the tunnel. The rearward movement of the fingers reduces the breaking or shattering of plants and thereby reduces contamination of the cotton. The gyratory movement of the fingers in the slots also wipes the leaves, stems, twigs and the like from the fingers 39, thereby keeping the picking slots 41 open.

It will be understood that the new device may be modified considerably from the arrangement disclosed in Figs. 1 to 6 and described above. For example, if it is desired to pick two rows of cotton at a time, two separate tunnels and associated elements including separate sets of picking fingers can be provided on a single machine.

In some instances, it may be desirable to arrange for a greater number of picking fingers in the tunnel. This can be accomplished in the manner disclosed in Fig. 7 of the drawing. In this form of the invention, the tunnel 65 has both of its side plates 66 and 67 slotted longitudinally to receive sets of picking fingers 68 and 69 therethrough. Each of the sets of picking fingers 68, 69 is mounted on a hollow manifold 70, 71, respectively, like the manifold 37 described above and both manifolds 70, 71 are supported for gyratory movement on the rotary arms 72, 73 and 74, 75 for movement into and out of the gap between the plates 66 and 67. In this way, the picking fingers may be very closely spaced without substantially weakening the manifold, increasing its weight, or impart high gyratory or centrifugal force thereto which would adversely affect its operation.

Figure 9:
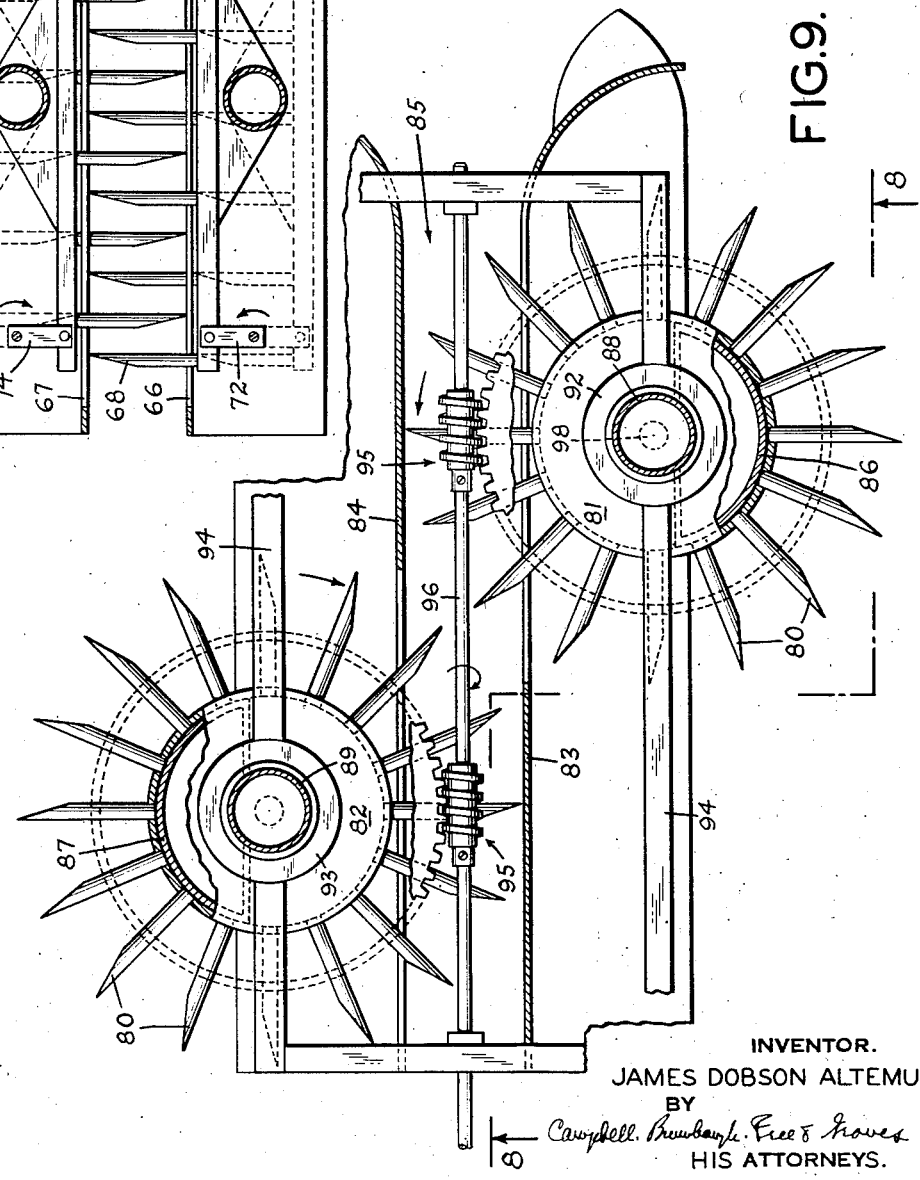
Fig. 9 is a fragmentary plan view with parts broken away and shown in section illustrating the arrangement of the rotary manifolds shown in Fig. 8.
Figure 8:
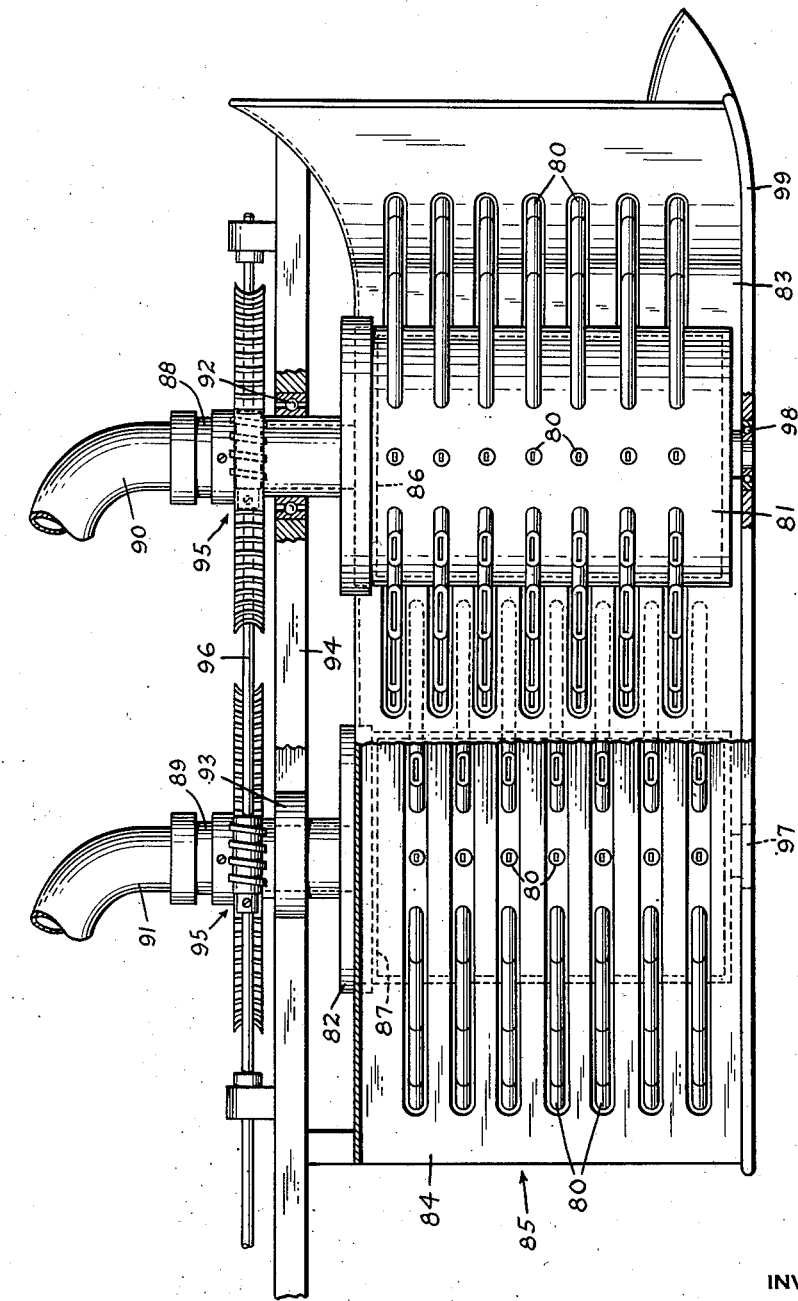
Fig. 8 is an elevational view with parts broken away and shown in section of a modified form of device utilizing rotary manifold having picking fingers thereon.

The picking mechanism may be further modified as, for example, in the manner shown in Figs. 8 and 9. As illustrated in these figures, the picking fingers 80 may be mounted on the rotary drums 81 and 82 which are disposed on opposite sides of the plates 83 and 84 forming the sides of the picking tunnel 85. The fingers extend through slots in the side plates of the tunnel 85 and the drums or manifolds 81 and 82 are preferably spaced lengthwise apart along the length of the tunnel 85 so that it will not be weakened excessively and in order to provide proper spacing of the picking fingers. As indicated in Fig. 9, the manifold may be provided with inner concave shields 86 and 87 which shut off the flow of air inwardly through the fingers when they are out of the tunnel 85. The use of the shields 86 and 87 prevents waste of suction and allows a smaller pump to be used or a larger pump to produce higher air velocity than if the fingers were completely open at all times. Moreover, by shutting off the fingers behind the shields 86 and 87 from suction, debris, such as twigs, leaves and the like, that is clinging to the fingers due to the flow of air therethrough and not removed by movement of the fingers through the slots in the tunnel walls can drop off onto the ground. As shown in Fig. 8, the drums have upwardly extending hollow necks 88 and 89 thereon which are connected to the flexible conduits 90 and 91 leading back to a hopper corresponding to the hopper 13. The drums are suspended for rotation in bearings 92 and 93 in the side support arms 94 and may be rotated by means of a worm, worm gear drive 95 between the drums and shaft 96. The lower ends of the drums may also be supported on bearings 97 and 98 carried by laterally extending flanges 99 on the side plates 83 and 84. It will be understood that the rotary drums and the picking tunnel 85 will also be supported on a frame for adjustment up and down to enable it to be brought into the proper relation to the ground and the cotton plants.

The picking fingers in each of the modifications described above operates to draw the fibres and only small particles of debris, such as small pieces of leaves and small stems, into the hopper 13. The flow of air into and along the fingers has a tendency to straighten out the fibres so that there is less danger of them being tangled and twisted and thus rendered hard to gin. The movement of the fingers relative to the walls of the tunnel causes the larger leaves, twigs and the like to be stopped off the fingers to clean them and prevent the picking slots therein from being blocked.

When the hopper 13 has been filled or substantially filled with fibres, they may be discharged through the conduit 100 at the upper right-hand corner of the hopper 13. This can be accomplished by moving the flap valve 18 so that it covers the exhaust outlet 17 and connects the pressure side of the pump 15 to the hopper 13. A valve 101 which is interposed in the conduit 14 between the end of the box is operated by means of a hand wheel 102 to close the inlet from the hopper 13 to the pump and open an inlet 103 in the conduit 14 to the atmosphere. Thus, outside air is drawn into the pump and blown into the hopper 13 through the conduit 16. At the same time, a valve 105 which normally closes the lower end of the discharge conduit 100 can be moved down into a position covering the inlet end of the pipe 44 so that the air entering the hopper 13 from the pump 15 must flow out through the discharge conduit 100 thereby blowing the cotton out with it to a truck, for example, to be carried to a remote point for ginning and further treatment.

From the preceding description, it will be clear that I have provided a device which because of the close juxtaposition of the fingers to the cotton in the bolls, plucks the fibres from the bolls while avoiding the collection of debris, such as stems, leaves and the like. It achieves a maximum effectiveness because the fingers not only come close to the cotton bolls on the plant but in many instances, actually enter them and thus withdraw the cotton fibres by intimate contact therewith. The cotton delivered by the fingers is relatively free of a debris of all kinds and because it has not been twisted or worked during its removal, it can be ginned to clean it with ease. The grade of cotton thus removed by the picking device is very close to that which is produced by careful hand picking and is obtained with a minimum loss of the cotton fibres' length and strength.

From the preceding description, it will be apparent that cotton harvesting devices embodying the present invention are susceptible to considerable modification and that various arrangements of the picking fingers can be used if desired. It will be understood further that instead of using fingers made out of stiff metal tubing, they may be formed of plastic. It may be found desirable, in some instances, to form them of a flexible or resilient material, such as natural or synthetic rubber or a flexible plastic, such as nylon, polyethylene or polyvinyl resins and the like, to enable them to move inwardly more freely through the branches of the cotton plant without breaking the branches or damaging the fingers. Accordingly, it will be apparent that the above-described modifications of the invention are illustrative and should not be considered as limiting the scope of the following claims.

I claim:

1. A cotton harvesting device comprising a tunnel member having a pair of spaced apart side plates to be moved along a row of cotton plants, one of said side plates having a plurality of narrow slots therein extending substantially in the direction of movement of said tunnel member, frame means supporting said tunnel member for movement along the row, a hollow manifold member adjacent to and outside of one side plate of said tunnel member, a plurality of hollow picking fingers on and communicating with the interior of said manifold member, means on said frame means mounting said manifold for gyratory movement relative to said tunnel member for moving said fingers into and out of said tunnel member through said slots and transversely and lengthwise of said tunnel member to engage cotton plants therein, each finger having a slot therein, means mounted on said frame means for gyrating said manifold member, and means mounted on the frame means and connected with said manifold member to create a reduced pressure in said manifold member to draw air through said slots in said fingers and entrain and draw cotton fibers into said fingers and said manifold member.

2. The device set forth in claim 1 comprising hopper means mounted on said frame means and connected with said manifold member, said hopper means communicating with the means to create a reduced pressure and receiving the entrained fibres from said manifold.

3. A cotton picking device comprising a vehicle movable along the ground, a hopper on said vehicle, a tunnel member on said vehicle having a tunnel therein to move along a row of cotton plants, a hollow plate-like member connected to and communicating with said hopper and mounted movably on said vehicle adjacent to the member having the tunnel therein, a plurality of hollow picking fingers extending outwardly from one side of said plate-like member substantially perpendicular thereto and communicating with its interior, said fingers being movable with said plate-like member transversely of said tunnel, and having slots extending substantially lengthwise thereof, means mounted on said vehicle for moving said manifold to move said fingers transversely of the tunnel and means mounted on said vehicle and connected to said hopper for creating a reduced pressure in said hopper and manifold to draw air into said fingers through said slots, entrain cotton fibres in the air and deliver the fibres to said hopper.

4. The device set forth in claim 3 in which each finger is a hollow tubular member having an end, inclined to the axis of the finger with said slot extending lengthwise of said inclined side.

5. The device set forth in claim 3 in which said means for creating suction is an air pump having an inlet and an outlet, and comprising valves interposed between said hopper and the inlet and the outlet of said pump for selectively connecting the inlet and the outlet of the pump to the hopper, and a discharge conduit communicating with and extending from said hopper through which cotton fibers can be discharged by said air pump.

6. The device set forth in claim 3 in which said tunnel member has side walls defining said tunnel, said side walls having openings therein through which said fingers extend into said tunnel.

7. A cotton picking device comprising a frame supported by wheels for movement along the ground, a hopper on said frame, a tunnel member on said frame having a pair of side plates spaced apart to define a tunnel therein to move along a row of cotton plants, a hollow manifold member communicating with said hopper and mounted on said frame for gyratory movement relative to said frame adjacent to one side of said tunnel member, a plurality of hollow tubular picking fingers extending from said manifold member and communicating with its interior, said fingers having air entry slots therein, at least one of said side plates having slots lengthwise thereof to receive said fingers, means on said frame to move said manifold member and said fingers substantially transversely of said tunnel to cause said fingers to gyrate relative to said tunnel member to engage the plants therein, and a pump to draw air through the slots in said fingers, said manifold and said hopper to entrain cotton fibres therein.

8. The device set forth in claim 7 comprising manifold members on opposite sides of said tunnel member having picking fingers entering said tunnel from opposite sides thereof.

References Cited in the file of this patent

UNITED STATES PATENTS

| | | |
|---|---|---|
| 767,058 | Harvin | Aug. 9, 1904 |
| 830,102 | Richmond | Sept. 4, 1906 |
| 850,700 | Worswick | Apr. 16, 1907 |
| 858,371 | Corley | July 2, 1907 |
| 1,020,838 | Neer | Mar. 19, 1912 |
| 1,052,361 | Merritt | Feb. 4, 1913 |
| 1,107,908 | Cunningham | Aug. 18, 1914 |
| 1,166,935 | Rhodes | Jan. 4, 1916 |
| 1,225,193 | Vittetoe | May 8, 1917 |
| 1,447,328 | Rycroft | Mar. 6, 1923 |
| 1,646,594 | Phelps et al. | Oct. 25, 1927 |
| 1,713,398 | Rountree | May 14, 1929 |
| 1,727,745 | Burrows | Sept. 10, 1929 |
| 1,845,431 | Martin | Feb. 16, 1932 |
| 1,953,639 | Waggoner | Apr. 3, 1934 |
| 2,256,821 | Welty | Sept. 23, 1941 |
| 2,292,994 | Flewellen | Aug. 11, 1942 |
| 2,493,564 | Arneson | Jan. 3, 1950 |
| 2,520,927 | Hagen | Sept. 7, 1950 |
| 2,602,278 | Sam | July 8, 1952 |
| 2,673,436 | Urban | Mar. 30, 1954 |
| 2,702,976 | Diserens | Mar. 1, 1955 |